(12) United States Patent
Shi et al.

(10) Patent No.: US 10,161,807 B2
(45) Date of Patent: Dec. 25, 2018

(54) THIN-FILM THERMOCOUPLE FOR MEASURING THE TEMPERATURE OF A CERAMIC MATRIX COMPOSITE (CMC) COMPONENT

(71) Applicant: Rolls-Royce Corporation, Indianapolis, IN (US)

(72) Inventors: Jun Shi, Carmel, IN (US); Brandon Anderson, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 148 days.

(21) Appl. No.: 15/274,238

(22) Filed: Sep. 23, 2016

(65) Prior Publication Data

US 2018/0087973 A1 Mar. 29, 2018

(51) Int. Cl.
| | | |
|---|---|---|
| *G01K 7/02* | (2006.01) | |
| *C04B 35/71* | (2006.01) | |
| *C04B 41/00* | (2006.01) | |
| *B32B 18/00* | (2006.01) | |
| *C04B 41/89* | (2006.01) | |
| *C04B 41/90* | (2006.01) | |
| *C04B 41/52* | (2006.01) | |

(52) U.S. Cl.
CPC .............. *G01K 7/028* (2013.01); *B32B 18/00* (2013.01); *C04B 35/71* (2013.01); *C04B 41/009* (2013.01); *C04B 41/52* (2013.01); *C04B 41/89* (2013.01); *C04B 41/90* (2013.01); *C04B 2235/3826* (2013.01); *C04B 2237/366* (2013.01); *C04B 2237/38* (2013.01)

(58) Field of Classification Search
None
See application file for complete search history.

(56) References Cited

U.S. PATENT DOCUMENTS

| | | | |
|---|---|---|---|
| 5,275,670 A | 1/1994 | Smialek et al. | |
| 5,474,619 A | 12/1995 | Kreider | |
| 6,533,976 B1 * | 3/2003 | Strasser | C04B 35/806 264/101 |
| 8,033,722 B2 | 10/2011 | Kulkarni et al. | |
| 8,607,577 B2 * | 12/2013 | Ruberte Sanchez | F01D 25/00 16/2.1 |
| 8,961,007 B2 | 2/2015 | Subramanian et al. | |

(Continued)

FOREIGN PATENT DOCUMENTS

WO WO 2007/130862 A2 11/2007

OTHER PUBLICATIONS

Wanga, X.H., Yamamoto, K., Eguchi, H. Obarab, H. and Yoshida, T.; "Thermoelectric properties of SiC thick films deposited by thermal plasma physical vapor deposition"; *Science and Technology of Advanced Materials* 4 (2003); pp. 167-172.

*Primary Examiner* — Andre Allen
(74) *Attorney, Agent, or Firm* — Brinks Gilson & Lione

(57) ABSTRACT

A thin-film thermocouple for measuring the temperature of a ceramic matrix composite (CMC) component includes a first thermocouple leg and a second thermocouple leg deposited on a surface of a CMC component, where each of the first and second thermocouple legs has a length extending from a reference end to a working end thereof. The working ends of the first and second thermocouple legs are joined at a junction region on the surface. At least one of the first thermocouple leg and the second thermocouple leg comprises silicon carbide.

20 Claims, 2 Drawing Sheets

(56) References Cited

U.S. PATENT DOCUMENTS

| | | | |
|---|---|---|---|
| 9,469,896 B2 * | 10/2016 | Antonaia | C23C 14/0042 |
| 9,663,404 B2 * | 5/2017 | de Diego | C04B 35/117 |
| 2007/0056624 A1 | 3/2007 | Gregory et al. | |

* cited by examiner

THIN-FILM THERMOCOUPLE FOR MEASURING THE TEMPERATURE OF A CERAMIC MATRIX COMPOSITE (CMC) COMPONENT

TECHNICAL FIELD

This disclosure is related generally to high-temperature thermocouples and more particularly to thin-film thermocouples for measuring the temperature of ceramic matrix composite (CMC) components.

BACKGROUND

Ceramic matrix composites (CMCs) have the capability to operate at temperatures up to 2400° F. (nearly 1320° C.) and future generations of CMCs protected by environmental barrier coatings offer the potential to withstand even higher operating temperatures. To decrease specific fuel consumption and reduce $NO_x$ emissions, CMC components based on composites of silicon carbide fibers in a silicon carbide matrix (SiC/SiC composites) are being developed for the hot sections of turbine engines. These CMC components include combustors, turbine shrouds, vanes and blades. A key enabling technology to support CMC component development is the ability to measure temperature and strain at temperatures of about 1320° C. and higher.

Thin-film metallic platinum-palladium (Pt/Pd) and ceramic indium oxide-indium tin oxide (InO/ITO) thermocouples have been tested under both thermal and mechanical cycling to determine their robustness. Although Pt:Pd and InO:ITO thin film thermocouples perform well in these cyclic tests, they have a relatively small thermoelectric power output for a given temperature. In addition, SiC/SiC composites produced by melt infiltration may have a significant percentage (e.g., about 2-10 vol. %) of free silicon due to incomplete conversion of molten silicon into silicon carbide; during high temperature exposure, this free or unreacted silicon may react with metals such as Pt in thermocouples.

To more accurately assess surface temperature and local temperature gradients on SiC/SiC CMC components, it would be advantageous to develop a new thermocouple approach that exhibits a significant improvement in thermoelectric power compared to Pt:Pd thin film thermocouples.

BRIEF SUMMARY

An improved thin-film thermocouple for measuring the temperature of a ceramic matrix composite (CMC) component is described herein. A method of making the thin-film thermocouple is also described.

The thin-film thermocouple comprises a first thermocouple leg and a second thermocouple leg deposited on a surface of a CMC component, where each of the first and second thermocouple legs has a length extending from a reference end to a working end thereof. The working ends of the first and second thermocouple legs are joined at a junction region on the surface. At least one of the first thermocouple leg and the second thermocouple leg comprises silicon carbide.

A method of making such a thin-film thermocouple comprises depositing first and second thermocouple legs on a surface of a CMC component, where each of the first and second thermocouple legs has a length extending from a reference end to a working end thereof. The working end of the second thermocouple leg is joined to the working end of the first thermocouple leg at a junction region on the surface. At least one of the first thermocouple leg and the second thermocouple leg comprises silicon carbide.

DETAILED DESCRIPTION

Described herein is a new thin-film thermocouple design that utilizes silicon carbide (SiC), a promising thermoelectric material with excellent thermal stability and good resistance to oxidation and corrosion. Silicon carbide may be employed for one or more legs (or "thermoelements") of the thermocouple. The new thermocouple may be effective for measuring surface temperature and local temperature gradients on CMC components.

Figure 1:
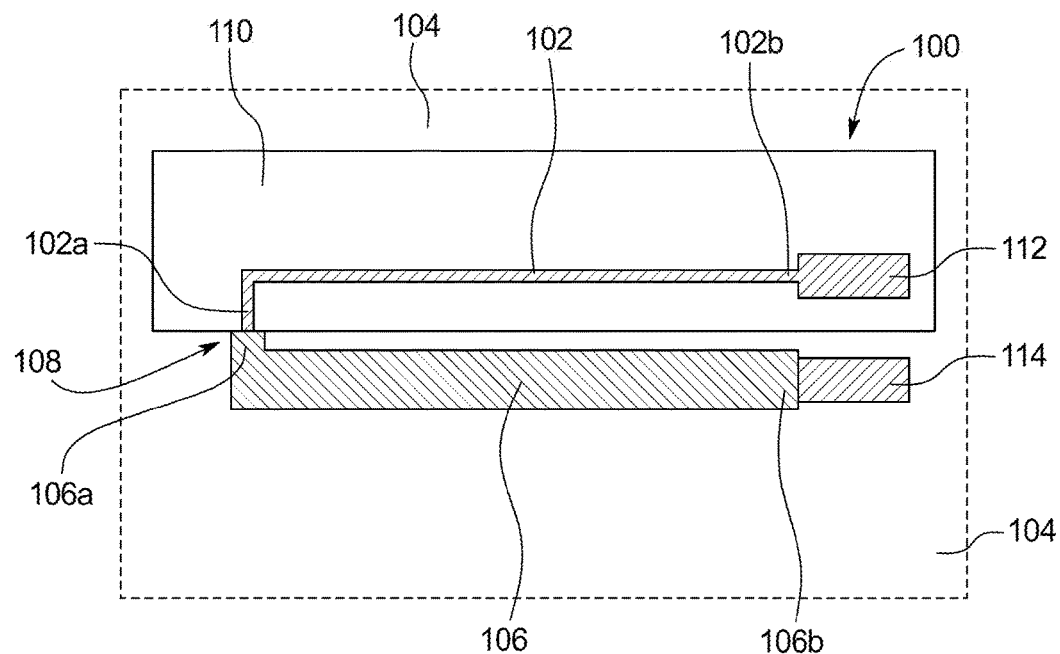
FIG. 1 is a schematic of an exemplary thin-film thermocouple including a first thermocouple leg comprising platinum or another high temperature metal and a second thermocouple leg comprising silicon carbide.
Figure 2:
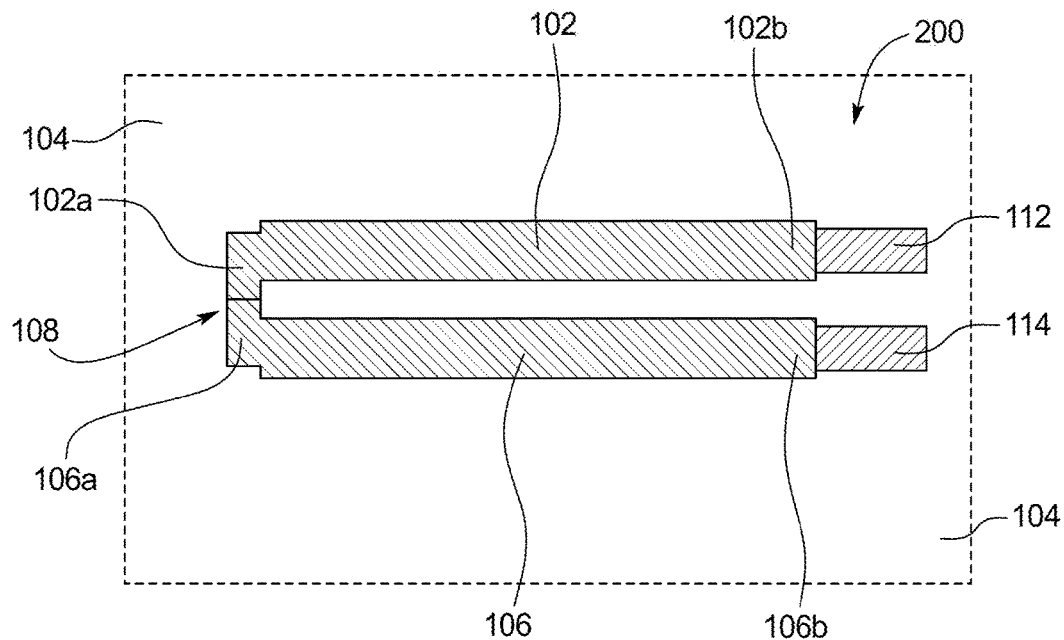
FIG. 2 is a schematic of an exemplary thin-film thermocouple including a first thermocouple leg comprising n-doped silicon carbide and a second thermocouple leg comprising p-doped silicon carbide.

Referring to FIGS. 1 and 2, a thin-film thermocouple 100,200 for measuring the temperature of a ceramic matrix composite (CMC) component includes a first thermocouple leg 102 and a second thermocouple leg 106 deposited on a surface 104 of a CMC component, where each of the first and second thermocouple legs 102,106 has a length extending from a reference end 102b,106b to a working end 102a,106a thereof. At least one of the first thermocouple leg 102 and the second thermocouple leg 106 comprises silicon carbide. The working ends 102a,106a of the first and second thermocouple legs 102,106 are joined at a first junction region 108 on the surface 104 that enables temperature measurement by the thermocouple 100,200. The surface on which the thin-film thermocouple 100,200 is formed may be a planar, curved and/or rough portion of the CMC component.

As known to one of ordinary skill in the art, operation of a thermocouple is based on the thermoelectric effect. At the junction region of two dissimilar conductive materials, a predictable voltage may be generated that relates to the difference in temperature between the working and reference ends of the thermocouple legs, or thermoelements. The voltage generated within the thermocouple can be measured by a potentiometer incorporated into the circuit, for example, in order to determine the temperature at the junction region.

In one example, as illustrated in FIG. 1, the first thermocouple leg 102 may comprise platinum or another metal with a suitably high melting point and the second thermocouple leg 106 may comprise silicon carbide. A Pt:SiC thermocouple can exhibit a thermoelectric power of at least 180 µV/° C., depending on dopant levels in the silicon carbide. In contrast, existing Pt:Pd thin film thermocouples have a thermoelectric power of approximately 10 µV/° C. Also, Pt:SiC thin film thermocouples can be used at temperatures as high as or in excess of 1600° C., while palladium starts to oxidize at temperatures well below this level. Thus, Pt—SiC thermocouples may be able to operate at considerably higher temperatures than conventional Pt:Pd thermocouples. Generally speaking, a metal having a melting point in excess of about 1600° C. may be used for the first thermocouple leg 102. Suitable metals may include, for example, chromium, iridium, molybdenum, niobium, osmium, platinum, rhenium, rhodium, ruthenium, tantalum, titanium, tungsten, vanadium, and/or zirconium. The metal employed for the first thermocouple leg 102 may thus be referred to as a "high temperature metal."

In another example, as illustrated in FIG. 2, the first thermocouple leg 102 may comprise n-doped silicon carbide and the second thermocouple leg 106 may comprise p-doped silicon carbide. Thin-film thermocouples based on n-doped and p-doped SiC are expected to exhibit similar advantages to Pt—SiC thermocouples.

The thin-film thermocouple 100,200 may further include first and second conductive bond pads 112,114 deposited on the surface 104 in electrical contact with the reference ends 102b,106b of the respective first and second thermocouple legs 102,106. The first and second conductive bond pads 112,114 may comprise the high temperature metal (e.g., platinum) or another electrically conductive material.

In the example shown in FIG. 1, where the first thermocouple leg 102 and the first and second bond pads 112,114 comprise platinum or another high temperature metal, the first and second bond pads 112,114 may be deposited simultaneously with the first thermocouple leg 102, as discussed further below.

The thin-film thermocouple 100,200 may also include an electrically insulating layer 110 deposited between (a) the surface 104 and (b) the first thermocouple leg 102, the second thermocouple leg 106, the first conductive bond pad 112 and/or the second conductive bond pad 114 for electrical isolation, as shown in FIG. 1. Alternatively, the first and/or second thermocouple leg 102,106 may be deposited directly on the surface 104 without an electrically insulating layer therebetween, as shown in FIG. 2. This may be the case when the first and/or second thermocouple leg 102,106 comprises silicon carbide. When present, the insulating layer 110 may comprise a material such as mullite, alumina or a spinel and may electrically isolate parts or all of the thin-film thermocouple 100,200 from the CMC component.

Advantageously, to avoid unwanted chemical reactions during use of the thermocouple 100,200 at elevated temperatures, the thermocouple leg(s) that include silicon carbide may not include unreacted (free) silicon. This is particularly important for a Pt—SiC thermocouple 100 having a first thermocouple leg 102 comprising Pt and a second thermocouple leg 106 comprising SiC, since the Pt is susceptible to reactions with silicon at elevated temperatures. The silicon carbide may be pure silicon carbide or doped silicon carbide, which includes a dopant to enhance conduction. (Silicon carbide is a semiconductor.) Undoped or pure silicon carbide may exhibit n-type conduction, while doped silicon carbide may exhibit enhanced n- or p-type conduction depending on the dopant. N-doped silicon carbide may include nitrogen or phosphorus as a dopant, while p-doped silicon carbide may include a dopant selected from among boron, boron carbide, beryllium, aluminum and gallium.

For the example of FIG. 1, where the first thermocouple leg 102 comprises Pt or another high temperature metal and the second thermocouple leg 106 comprises SiC, the first thermocouple leg may have a thickness of up to about 25 microns, and the second thermocouple leg may have a thickness of up to about 75 microns. The difference in the thicknesses may be attributed to the roughness of the surface directly underlying the thermocouple legs; in the case of the first thermocouple leg 102, an insulating layer 110 that has undergone a polishing step after deposition may provide a smooth surface (e.g., less than 25 microns in surface roughness) on which to deposit the first thermocouple leg 102, while the second thermocouple leg 106 may be deposited directly on the melt-infiltrated SiC/SiC composite surface, which may exhibit a more substantial surface roughness. Generally speaking, the thickness of the first thermocouple leg 102 may be from about 1 micron to about 25 microns, and the thickness of the second thermocouple leg 106 may be from about 1 micron to about 75 microns.

For the example of FIG. 2, where the first and second thermocouple legs 102,106 both comprise silicon carbide (each including a different dopant) and where an insulating layer is not necessarily applied to the surface 104 of the CMC component, the thickness of each thermocouple leg 102,106 may range from about 1 micron to about 75 microns.

As suggested in the figures, the widths of the first and second thermocouple legs 102,106 may vary over a fairly broad range. For example, the width of each of the first and second thermocouple legs 102,106 may range from about 500 microns to several centimeters, and is more typically in the range from about 1 mm to about 1 cm. The length of each thermocouple leg 102,106 may vary over a large range also, such as from about 5 mm to about 500 cm, and more typically from about 10 mm to about 100 cm. The length of the thermocouple legs 102,106 may be determined by the extent of the surface 104 exposed to elevated temperatures and where temperature measurement is needed, as it may be desirable to keep the reference ends 102b,106b of the thermocouple 100,200 at much lower temperatures.

Figure 3:
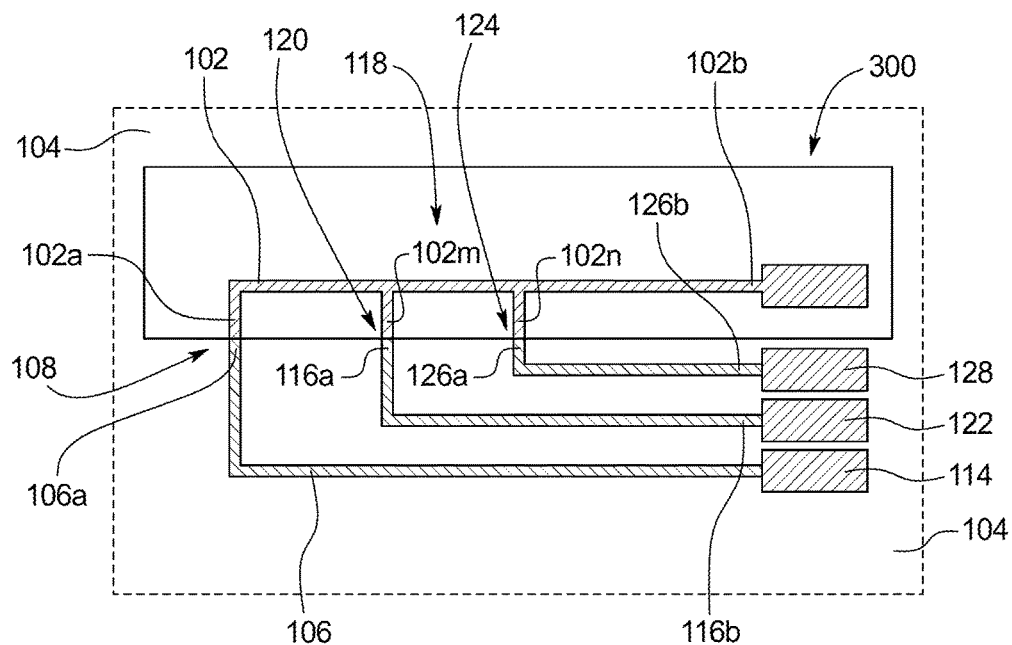
FIG. 3 is a schematic of an exemplary thin-film thermocouple comprising additional thermocouple legs to facilitate temperature measurement over multiple regions of a surface.

Referring now to FIG. 3, the thin-film thermocouple may further include additional thermocouple legs to facilitate measurement of temperatures at different regions on the surface and/or temperature gradients. For example, the thin-film thermocouple 300 may include a third thermocouple leg 116 deposited on the surface 104 and having a length extending from a reference end 116b to a working end 116a thereof. The third thermocouple leg 116 may comprise silicon carbide. The working end 116a of the third thermocouple leg 116 may be joined to the first thermocouple leg 102 at an additional sensing end 102m extending from a midsection 118 of the first thermocouple leg 102 (between the working and reference ends 102a,102b), thereby defining a second junction region 120 for temperature measurement on a different part of the surface 104. Due to this configuration, the length of the third thermocouple leg 116 may be shorter than that of the second thermocouple leg. The reference end 116b of the third thermocouple leg 116 may be in contact with a third bond pad 122 deposited on the surface 104.

The thin-film thermocouple 300 may further include a fourth thermocouple leg 126, which is also shown in FIG. 3. The fourth thermocouple leg 126 may be deposited on the surface 104 and have a length extending from a reference end 126b to a working end 126a thereof. Like the second and third thermocouple legs 106, 116, the fourth thermocouple leg 126 may comprise silicon carbide. The working end 126a of the fourth thermocouple leg 126 may be joined to the first thermocouple leg 102 at an additional working end 102n extending from a midsection 118 of the first thermocouple leg 102 (between the working and reference ends 102a,102b), thereby defining a third junction region 124 for temperature measurement on a different part of the surface 104. Due to this configuration, the length of the fourth thermocouple leg 126 may be shorter than that of the second thermocouple leg 106 and/or the third thermocouple leg 116. The reference end 126b of the fourth thermocouple leg 126 may be in contact with a fourth bond pad 128 also deposited on the surface 104.

The thin-film thermocouple may include an arbitrary number (n) of additional thermocouple legs as described above, where n is a positive integer, e.g., $2 \leq n \leq 20$, to permit temperature measurement on different parts of the surface of the CMC component. Accordingly, temperature gradients over the surface of the component can be identified.

As described above, the additional thermocouple leg(s), which may comprise silicon carbide, may not include unreacted (free) silicon. The silicon carbide may be pure silicon carbide or doped silicon carbide, which includes a dopant to enhance conduction. N-doped silicon carbide may include nitrogen or phosphorus as a dopant, while p-doped silicon carbide may include a dopant selected from among boron, boron carbide, beryllium, aluminum and gallium.

An exemplary method of making a thin-film thermocouple, such as the thin-film thermocouples discussed above, is now described. The method entails forming a first thermocouple leg and a second thermocouple leg on a surface of a CMC component, where each of the first and second thermocouple legs has a length extending from a reference end to a working end thereof. At least one of the first thermocouple leg and the second thermocouple leg comprises silicon carbide. The working end of the second thermocouple leg is joined to the working end of the first thermocouple leg at a junction region on the surface, thereby enabling temperature measurement.

The first thermocouple leg may comprise platinum or another high temperature metal as set forth above and the second thermocouple leg may comprise silicon carbide. The silicon carbide may be pure silicon carbide or doped silicon carbide, which includes a dopant to enhance conduction, as described above. Alternatively, the first thermocouple leg may comprise n-doped silicon carbide and the second thermocouple leg may comprise p-doped silicon carbide. The n-doped silicon carbide may include nitrogen or phosphorus as a dopant, while the p-doped silicon carbide may include a dopant selected from among boron, boron carbide, beryllium, aluminum and gallium. The thermocouple leg(s) comprising silicon carbide preferably do not include unreacted (free) silicon.

The formation of each of the first and second thermocouple legs on the surface may comprise a deposition process such as vapor deposition or spray deposition. Suitable vapor deposition methods may include chemical vapor deposition (CVD) or physical vapor deposition (PVD) as known in the art, such as plasma enhanced CVD, sputtering and thermal evaporation. Suitable spray deposition methods may include thermal spray or other spray techniques known in the art. Dopants (when used) may be incorporated into the silicon carbide during deposition. For example, during CVD, an additional precursor gas (e.g., nitrogen gas ($N_2$) or trimethylaluminum ($Al(CH_3)_3$) comprising the desired dopant element may be employed to incorporate the dopant (N or Al in these examples) into the silicon carbide. Doping concentrations ranging from about $10^{14}$ cm$^{-3}$ to about $10^{19}$ cm$^{-3}$ are possible for either n-doped or p-doped SiC.

In order to form thermocouple legs having a desired size and shape, a deposition mask may be used. More specifically, vapor and/or spray deposition of each of the first and second thermocouple legs may be carried out using a deposition mask that has at least one opening corresponding to a predetermined shape of the respective first or second thermocouple leg. As would be recognized by the skilled artisan, third, fourth and/or $n^{th}$ thermocouple legs may be formed in the same way. Up to n thermocouple legs, where n is an integer from 2 to 20, may be formed on the surface. Thermocouple legs comprising the same material (e.g., two or more thermocouple legs comprising silicon carbide) may be formed simultaneously during a single deposition step with a deposition mask having multiple openings. As an alternative to vapor or spray deposition using a mask, deposition of some or all of the n thermocouple legs may be achieved by combining a blanket deposition step with photolithography and etching methods known in the art. As a consequence of the deposition process, each thermocouple leg is not merely disposed on the surface but rather is physically and/or chemically bonded to the surface.

The method may further entail depositing first and second conductive bond pads on the surface, where the first and second conductive bond pads are in contact with the reference ends of the respective first and second thermocouple legs. Up to n conductive bond pads, where n is an integer from 2 to 20, may be formed on the surface, corresponding to the number of thermocouple legs. The conductive bond pads may be formed using a deposition process known in the art, such as vapor deposition or spray deposition, as set forth above. In order to form conductive bond pads having a desired size and shape, a deposition mask may be used. More specifically, vapor and/or spray deposition of each of the n conductive bond pads may be carried out using a deposition mask which has at least one opening corresponding to a predetermined shape of the respective conductive bond pad. Additionally, conductive bond pads and thermocouple legs comprising the same material (e.g., bond pads and thermocouple legs comprising platinum or another high temperature metal) may be formed simultaneously during a single deposition step with a deposition mask having appropriately designed openings. As an alternative to vapor or spray deposition using a mask, deposition of the conductive bond pads may be achieved using a blanket deposition step along with photolithography and etching methods known in the art. Like the thermocouple legs, the bond pads are not merely disposed on the surface but rather are physically and/or chemically bonded to the surface as a consequence of the deposition process.

The method may further comprise, prior to depositing the first, second and/or $n^{th}$ thermocouple legs on the surface, forming an insulating layer on the surface. Also or alternatively, the insulating layer may be formed prior to deposition of the first, second and/or $n^{th}$ conductive bond pads on the surface. Formation of the insulating layer may be carried out using a slurry coating process in which ceramic particles (e.g., mullite, alumina, spinel or other oxide particles) in a suitable liquid carrier (e.g., water) are applied to the surface to form a coating. After drying to remove carrier, the particles may be sintered (e.g., in air at a temperature of from 1000-1500° C. for 1-10 hours) to densify the coating. Sintering may be followed by a polishing step to reduce the surface roughness of the applied coating. As an alternative to slurry coating, a deposition process known in the art, such as vapor deposition or spray deposition, as set forth above, may be employed to form the insulating layer. Deposition may be carried out in a blanket deposition step that does not utilize a deposition mask, or a deposition mask may be employed to form an insulating layer of a predetermined shape and size on the surface.

Figure 4:
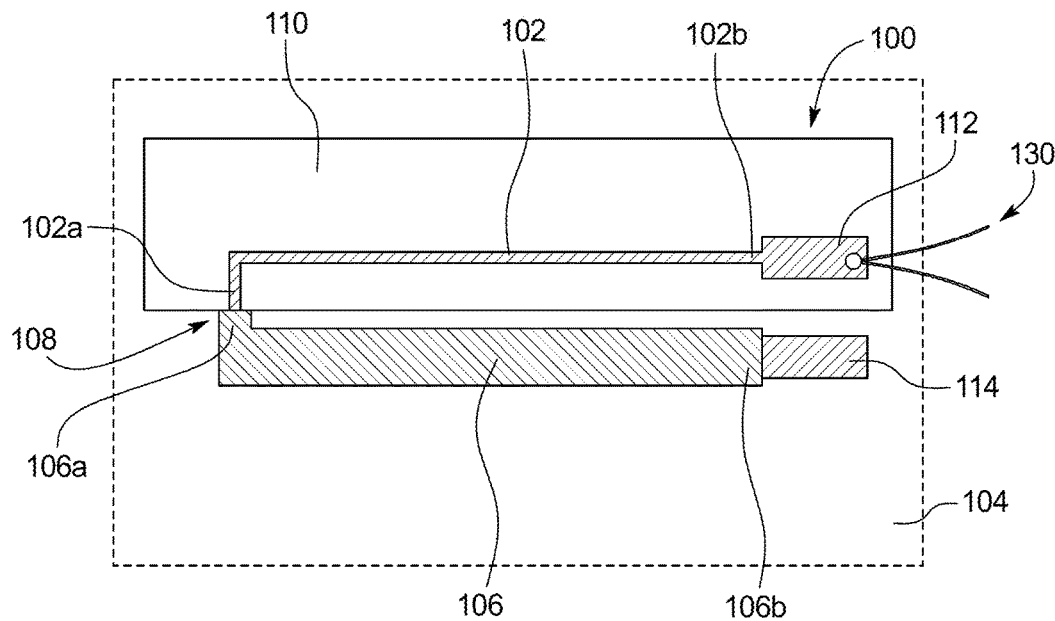
FIG. 4 is a schematic showing measurement of the cold junction (or reference) temperature of an exemplary thin-film thermocouple.

Finally, the process may further entail making electrical connections to the bond pads from an external circuit to utilize the thin-film thermocouple for temperature measurement. Also, as illustrated in FIG. 4, a secondary thermocouple 130 may be installed on one of the bond pads 112 to determine a "reference" or "cold junction" temperature. The secondary thermocouple 130 may be formed from two wires comprising two dissimilar metals that are attached or bonded together on the bond pad 112.

The CMC component having the surface on which the thin-film thermocouple is applied may be fabricated using CMC production methods known in the art. For example, a porous fiber preform may be formed by lay-up of a plurality of woven or unwoven ceramic (e.g., silicon carbide) fibers. The ceramic fibers may be coated with an interphase coating (e.g., comprising pyrolytic carbon or boron nitride (BN)) before or after the porous fiber preform is assembled. The interphase coating may serve as an interface between the silicon carbide fibers and the melt during a subsequent melt infiltration step, and also as a compliant layer to enhance toughness and crack deflection in the densified composite. The porous fiber preform may then be rigidized by application of a ceramic coating (e.g., silicon carbide) thereto using a process such as chemical vapor infiltration. A slurry infiltration step may then be employed to load the porous fiber preform with particulate solids (e.g., silicon carbide) prior to infiltration with a melt comprising silicon. After melt infiltration and cooling, a CMC component comprising ceramic fibers (e.g., SiC) in a ceramic matrix (e.g., SiC) may be formed. The CMC component may comprise a SiC/SiC ceramic matrix composite. Such CMC components (e.g., combustors, turbine shrouds, vanes and blades) can withstand operating temperature up to nearly 1320° C. in turbine engines.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and embodiment lacking the same may be contemplated as within the scope of the invention, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary. All documents cited herein are hereby incorporated by reference in their entirety for all purposes.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A thin-film thermocouple for measuring the temperature of a ceramic matrix composite (CMC) component, the thin-film thermocouple comprising:
a first thermocouple leg and a second thermocouple leg deposited on a surface of a CMC component, each of the first and second thermocouple legs having a length extending from a reference end to a working end thereof, the working ends of the first and second thermocouple legs being joined at a junction region on the surface,
wherein at least one of the first thermocouple leg and the second thermocouple leg comprises silicon carbide.

2. The thin-film thermocouple of claim 1, wherein the first thermocouple leg comprises a metal having a melting point above about 1600° C. and the second thermocouple leg comprises silicon carbide.

3. The thin-film thermocouple of claim 2, wherein the first thermocouple leg comprises platinum and the second thermocouple leg does not include unreacted silicon.

4. The thin-film thermocouple of claim 2, wherein the silicon carbide comprises doped silicon carbide.

5. The thin-film thermocouple of claim 4, wherein the doped silicon carbide comprises a dopant selected from the group consisting of nitrogen, phosphorus, boron, boron carbide, beryllium, aluminum and gallium.

6. The thin-film thermocouple of claim 1, wherein the first thermocouple leg comprises n-doped silicon carbide and the second thermocouple leg comprises p-doped silicon carbide.

7. The thin-film thermocouple of claim 6, wherein the n-doped silicon carbide includes a dopant selected from the group consisting of nitrogen and phosphorus, and wherein the p-doped silicon carbide includes a dopant selected from the group consisting of boron, boron carbide, beryllium, aluminum and gallium.

8. The thin-film thermocouple of claim 1, further comprising an electrically insulating layer deposited between the surface of the CMC component and one or both of the first and second thermocouple legs.

9. The thin-film thermocouple of claim 1, wherein one or both of the first and second thermocouple legs are deposited directly on the surface without an electrically insulating layer therebetween.

10. The thin-film thermocouple of claim 1, further comprising first and second conductive bond pads deposited on the surface,
wherein the reference ends of the first and second thermocouple legs are in contact with the respective first and second conductive bond pads.

11. The thin-film thermocouple of claim 10, further comprising an electrically insulating layer deposited between the surface and one or both of the first and second conductive bond pads.

12. The thin-film thermocouple of claim 1, wherein the CMC component comprises a SiC/SiC ceramic matrix composite.

13. The thin-film thermocouple of claim 1, further comprising a third thermocouple leg deposited on the surface, the third thermocouple leg having a length extending from a reference end to a working end thereof and comprising silicon carbide,
- wherein the length of the third thermocouple leg is shorter than the length of the second thermocouple leg, and
- wherein the working end of the third thermocouple leg is joined to the first thermocouple leg at an additional sensing end extending from a midsection thereof between the working and reference ends, thereby defining an additional junction region for temperature measurement on a different part of the surface.

14. The thin-film thermocouple of claim 13, further comprising a third bond pad deposited on the surface, and wherein the reference end of the third thermocouple leg is in contact with the third bond pad.

15. The thin-film thermocouple of claim 13, wherein up to n thermocouple legs are deposited on the surface, where n is a positive integer 2≤n≤20.

16. A method of making a thin-film thermocouple, the method comprising:
- depositing a first thermocouple leg on a surface of a ceramic matrix composite (CMC) component, the first thermocouple leg having a length extending from a reference end to a working end thereof; and
- depositing a second thermocouple leg on the surface, the second thermocouple leg having a length extending from a reference end to a working end thereof, the working end of the second thermocouple leg being joined to the working end of the first thermocouple leg at a junction region on the surface,
- wherein at least one of the first thermocouple leg and the second thermocouple leg comprises silicon carbide.

17. The method of claim 16, wherein the first thermocouple leg comprises a metal having a melting point above 1600° C. and the second thermocouple leg comprises silicon carbide.

18. The method of claim 17, wherein the first thermocouple leg comprises platinum and the second thermocouple leg does not include unreacted silicon.

19. The method of claim 16, wherein the first thermocouple leg comprises n-doped silicon carbide and the second thermocouple leg comprises p-doped silicon carbide.

20. The method of claim 16, wherein the depositing of each of the first and second thermocouple legs on the surface comprises vapor deposition or spray deposition using a deposition mask having an opening corresponding to a predetermined shape of the respective first or second thermocouple leg.

* * * * *